June 9, 1953 — L. E. LEE — 2,641,151
POWER-OPERATED TOOLHOLDER
Filed Feb. 8, 1949 — 10 Sheets-Sheet 3

INVENTOR
LUTHER E. LEE
BY *J. D. O'Brien*
ATTORNEY

June 9, 1953  L. E. LEE  2,641,151
POWER-OPERATED TOOLHOLDER
Filed Feb. 8, 1949  10 Sheets-Sheet 4

INVENTOR
LUTHER E. LEE
BY
ATTORNEY

June 9, 1953

L. E. LEE 2,641,151

POWER-OPERATED TOOLHOLDER

Filed Feb. 8, 1949

INVENTOR
LUTHER E. LEE
BY
ATTORNEY

June 9, 1953

L. E. LEE 2,641,151

POWER-OPERATED TOOLHOLDER

Filed Feb. 8, 1949

INVENTOR
LUTHER E. LEE
BY
ATTORNEY

June 9, 1953  L. E. LEE  2,641,151
POWER-OPERATED TOOLHOLDER

Filed Feb. 8, 1949  10 Sheets-Sheet 8

INVENTOR
LUTHER E. LEE
BY G. D. O'Brien
ATTORNEY

June 9, 1953    L. E. LEE    2,641,151
POWER-OPERATED TOOLHOLDER

Filed Feb. 8, 1949    10 Sheets-Sheet 9

INVENTOR
LUTHER E. LEE
BY *J. D. O'Brien*
ATTORNEY

June 9, 1953           L. E. LEE           2,641,151
POWER-OPERATED TOOLHOLDER
Filed Feb. 8, 1949                                   10 Sheets-Sheet 10
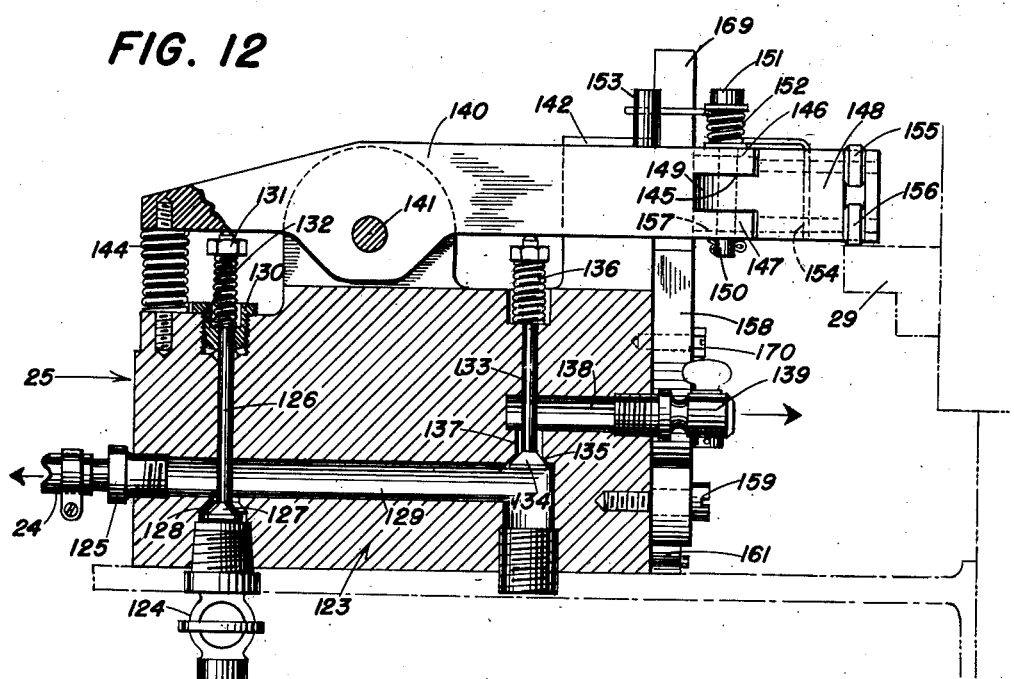
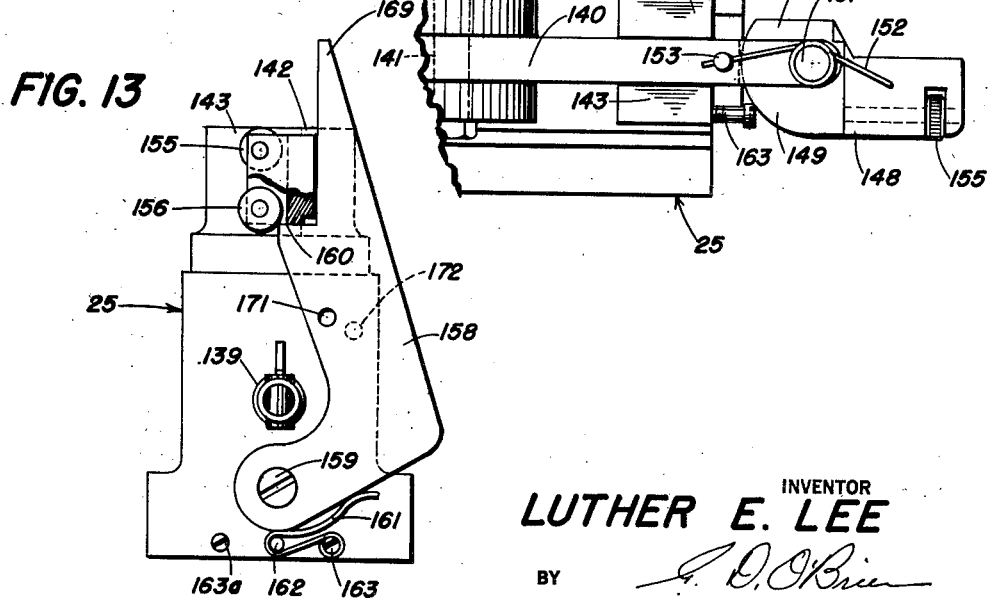
INVENTOR
LUTHER E. LEE
BY
ATTORNEY Patented June 9, 1953

2,641,151

UNITED STATES PATENT OFFICE 2,641,151

POWER-OPERATED TOOLHOLDER

Luther E. Lee, Takoma Park, Md.

Application February 8, 1949, Serial No. 75,281

16 Claims. (Cl. 82—21)

(Granted under Title 35, U. S. Code (1952), sec. 266)

The present invention relates to tool holding heads for machine tools such as planers, boring mills, lathes, slotters and the like and more particularly to a tool holding head which will position a cutting tool for cutting at various levels during a continuous working stroke.

The device of the present invention may be used with particular advantage in machining workpieces of large and complicated design. Such workpieces may be built up in skeletonized form by a welding process or may be in the form of large castings or the like. Large workpieces of this character ordinarily require machining operations upon a number of aligning bosses or mounting pads and each of these must, as a rule, be individually machined since they lie in different planes or, even though they may lie in the same plane a reinforcing rib or other obstruction may be located between the surfaces so as to prevent their both being machined in one operation. As is well known in the art, when workpieces of this type are being machined it is always preferable to take roughing cuts on all of the surfaces before taking any finishing cuts in order to allow for distortion due to warpage or possible movement of the workpiece during the roughing operations. Thus, it can be seen that individual machining of the surfaces normally requires a large number of setups or tool changes and is slow, tedious and expensive.

This invention contemplates the provision of a head having a moveable holder for the usual cutting tool and, in the present embodiment, such head is shown adapted for movement of the tool holder by compressed air. The head may be secured to the usual clapper box, or tool post and the cutting tool may be extended a measured amount to machine a surface in one plane, may be retracted to clear an obstruction and may then be extended to cut in the same or a predetermined different plane all during one continuous working stroke so as to continue the machining operation without interruption.

It is therefore an object to provide means automatically to retract a cutting tool in order to permit it to hurdle an obstruction and then to return the tool to its original or a predetermined different cutting position without interruption during the working sroke.

A further object of the present invention is to provide a cutting tool holder which can be set to automatically move to a plurality of predetermined positions in sequence during a continuous working stroke.

Still another object is to provide automatic means for rapidly changing the position of a cutting tool during a continuous working stroke so that the tool will machine in one plane during a part of the stroke and in a different plane during the remainder of the stroke.

A further object is to provide a novel indexing mechanism for successively moving a plurality of stops in the path of a tool holding ram in order to control the positioning of the cutting tool at predetermined positions.

An additional object is the provision of novel means for buffing the cutting tool holding ram in its retracting movement and for accurately locating the tool in retracted position.

Another object is to provide a tool actuating device that may be quickly and easily installed on a conventional machine tool without structural modification and which may be used at maximum cutting speed for the particular material being machined. By the present invention the number of work setups and tool changes is materially reduced and the work output per man-hour may be substantially increased.

Other objects and advantages will be hereinafter more fully described and for a complete understanding of the nature, scope and characteristics of this invention reference may now be had to the following description and accompanying drawings in which latter:

Fig. 12 is a vertical sectional view partly in elevation of one embodiment of the fluid pressure control valve employed in the present invention;

Fig. 13 is an end elevation of the control valve shown in Fig. 12, showing a trip lever detent; and Fig. 14 is a top plan view of the end of the trip lever shown in Figs. 12 and 13.

Figure 1:
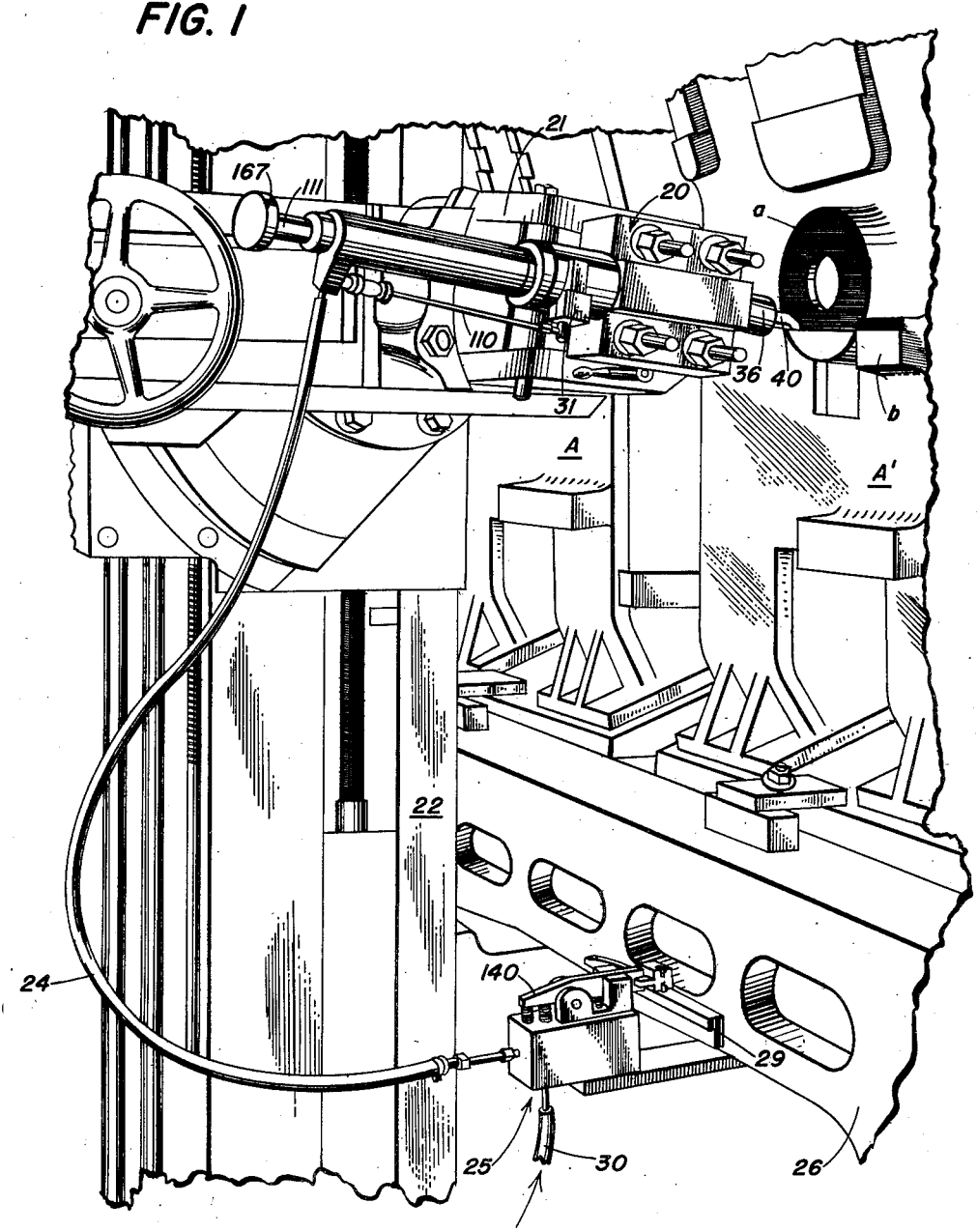
Fig. 1 is a fragmentary perspective view of one embodiment of the present invention showing a tool holding head and control valve mounted upon a planer.
Figure 2:
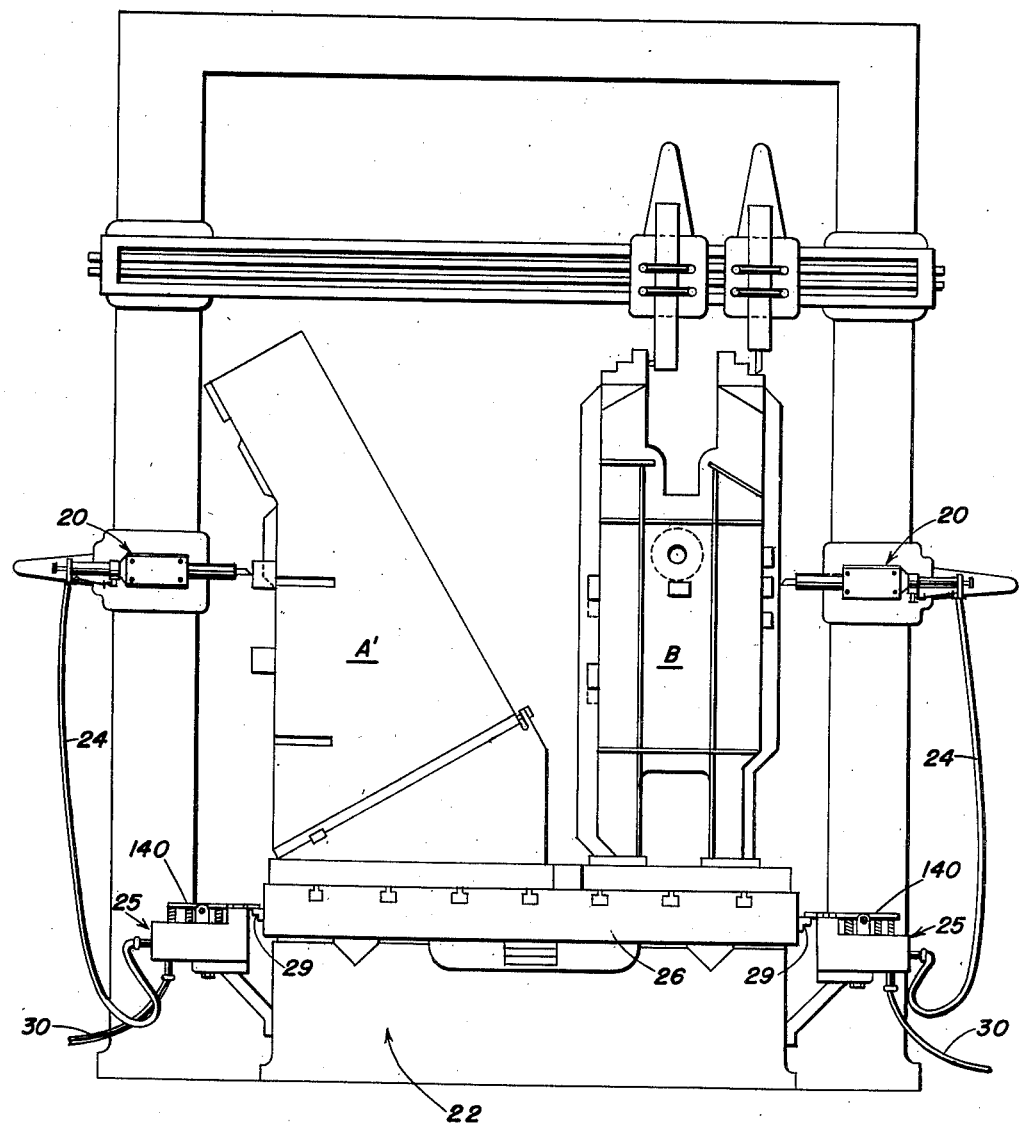
Fig. 2 is an end elevation of a planer upon which two tool holding heads of the present invention and two conventional tool holders have been installed for simultaneous operation upon a workpiece.
Figure 3:
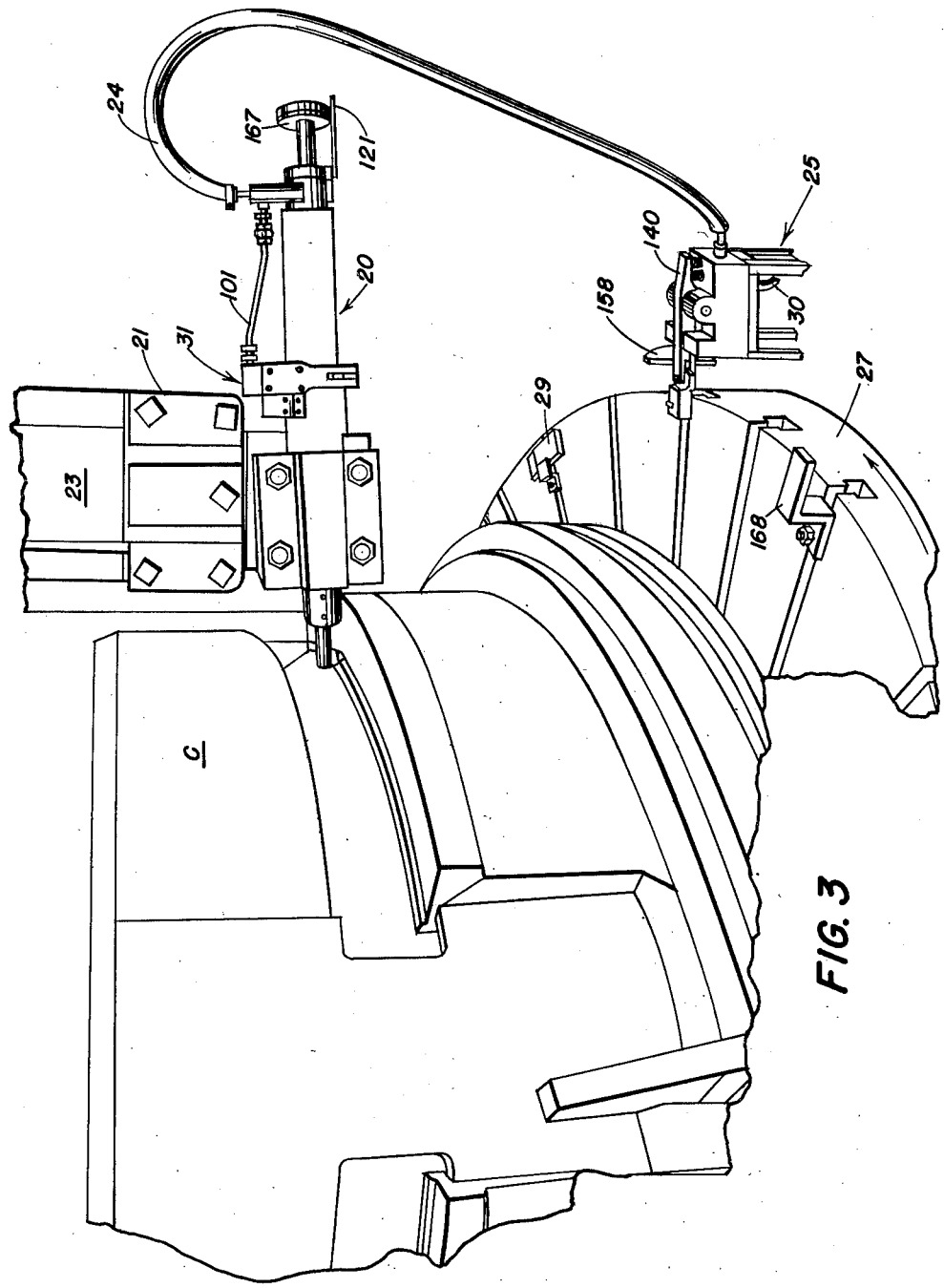
Fig. 3 is a fragmentary perspective view of the tool holding head and control of Fig. 1 shown mounted upon a vertical boring mill.

Referring to the drawings in detail; Figs. 1, 2 and 3 show how a head 20 of the present invention may be suitably mounted on the usual tool support or clapper box 21 of a machine tool such as a planer 22 (Fig. 1) or a vertical boring mill 23 (Fig. 3) and connected by a hose 24 with a fluid pressure control valve 25. This valve is preferably positioned adjacent a workpiece support or table such as the reciprocating table 26 of the planer, (or the rotating table 27 of the vertical boring mill Fig. 3), so that the valve operating lever 140 may be actuated by cam 29 carried by the work table. Air under pressure is supplied to the valve 25 through an inlet hose 30 from any suitable source.

An indexing device 31 may be provided as a part of the head structure as will hereinafter be described in detail and this indexing device may be operated by the air impulses controlled by valve 25 to position space blocks of selected length so as to accurately limit the movement of the cutting tool toward the workpiece.

The planer table may support a number of workpieces A, A' and B as illustrated in Figs. 1 and 2 and the vertical boring mill may have a workpiece C suitably mounted thereon.

Figure 4:
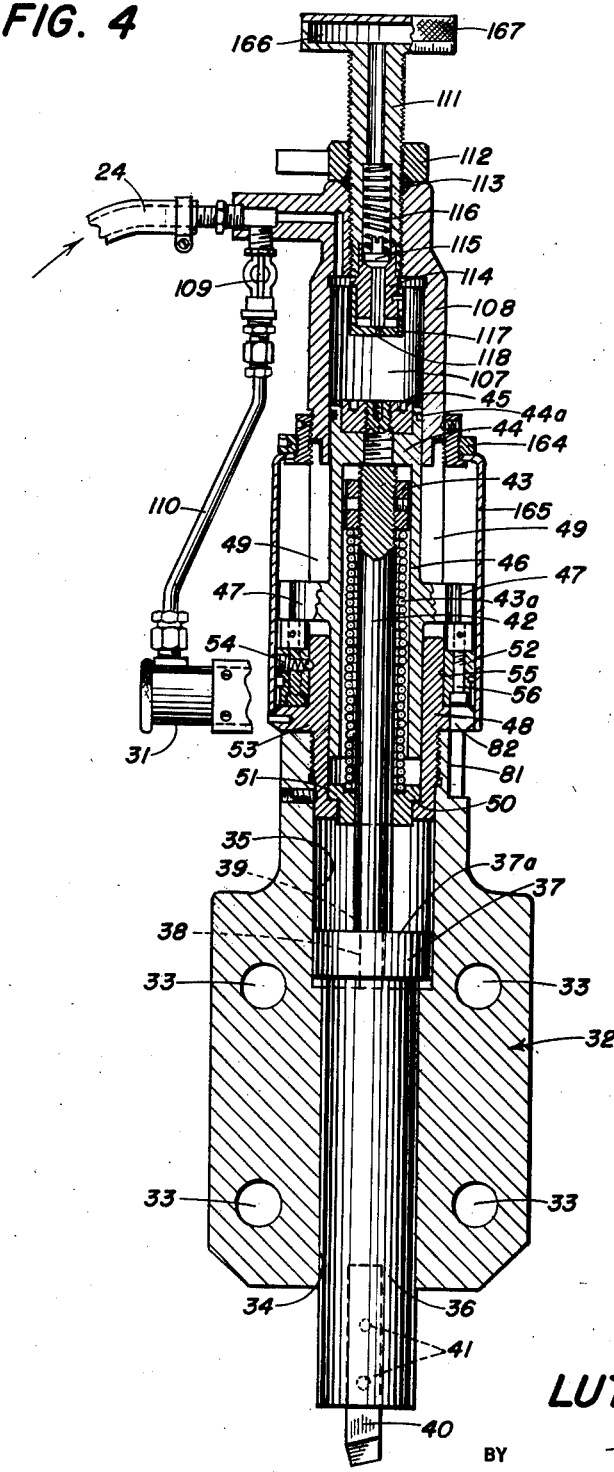
Fig. 4 is a sectional view taken substantially along the longitudinal axis of the tool holding head illustrated in Figs. 1, 2 and 3 and showing the tool holding ram in the extended position.
Figure 5:
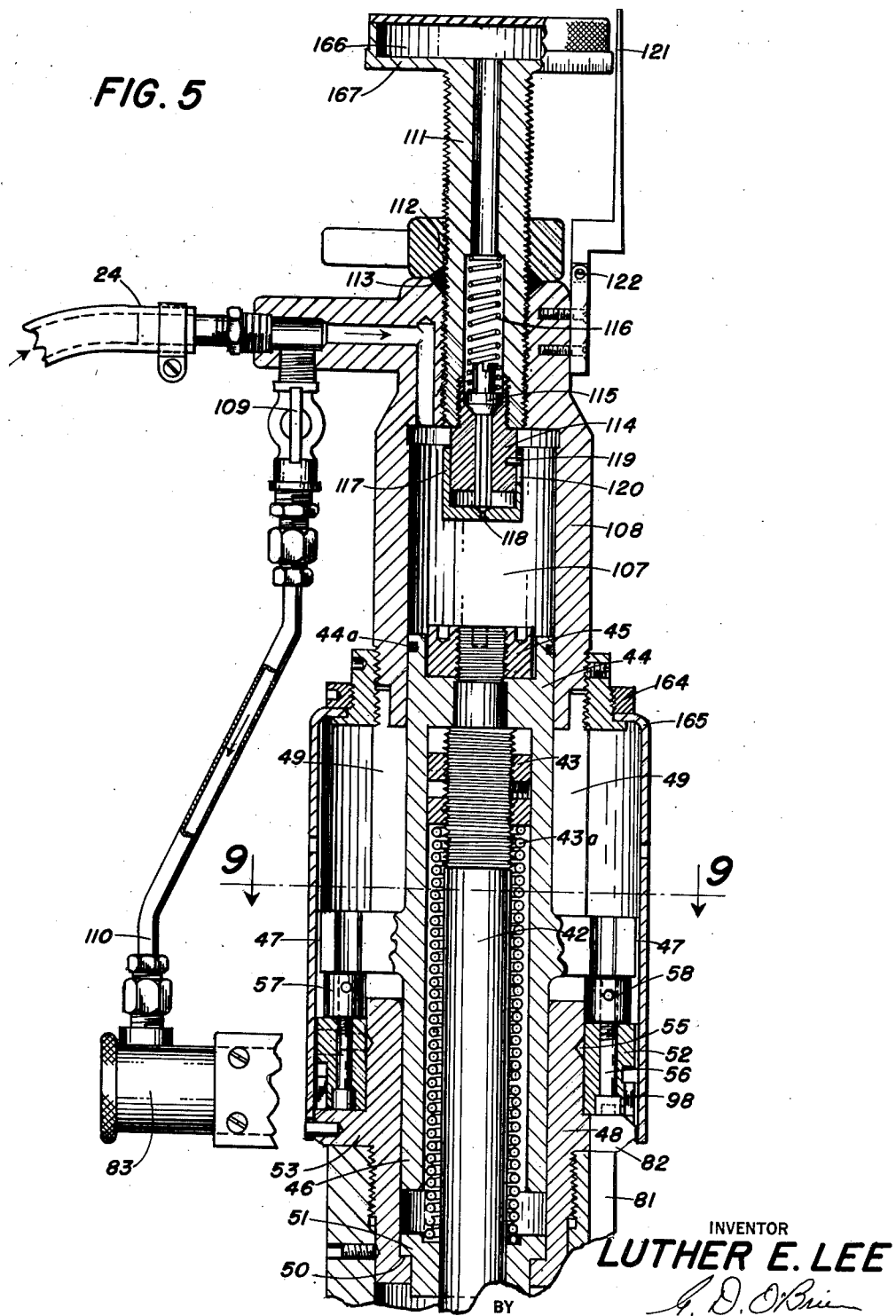
Fig. 5 is a detailed enlargement of the upper part of Fig. 4.
Figure 6:
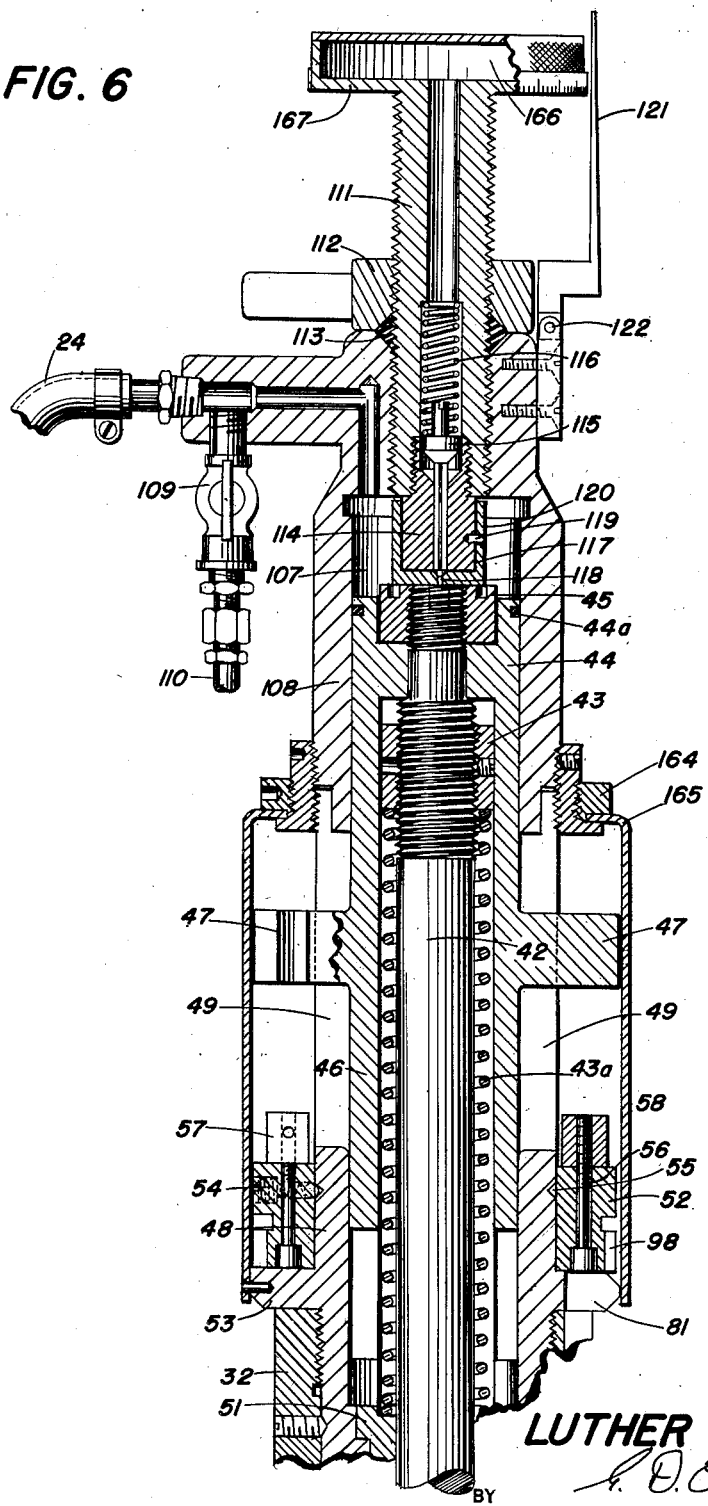
Fig. 6 is a change position view similar to Fig. 5 showing the ram operating piston in the retracted position.

Referring in detail to Figs. 4, 5 and 6 wherein the interior of a tool holding head is illustrated, the lower portion of the head 20 is widened to provide a mounting pad 32 having spaced mounting bolt receiving openings 33. A central vertical bore 34 is provided in the head and the upper part of the bore is enlarged at 35.

A ram 36 is shown vertically movable in said bore and has an enlarged head 37 located within the enlargement 35. A keyway 38 formed in head 37 is adapted to slidably engage key 39 for preventing rotational movement of ram 36. The lower end of the ram carries a tool 40 secured in place by set screws 41.

Extending upwardly from the upper end of the ram 36 and firmly secured thereto is a piston shaft 42 which is threaded at its upper end to receive a spring retaining nut 43 and is surrounded by a compression spring 43a. A piston 44 is mounted on the shaft 42 above the nut 43 and is retained in place by a large nut 45. This piston may be provided with one or more piston rings 44a as illustrated. The depending piston skirt 46 has integral therewith a pair of oppositely extending lugs 47, which in use engage with suitable stop pins to determine the position of the cutting tool in a manner hereinafter discussed in detail.

Piston skirt 46 continues downwardly and is received within a guide bushing 48 which bushing is supported by threaded engagement with the upper end of the mounting pad 32. The upper end of guide bushing 48 is provided with opposed slots 49 as shown particularly in Fig. 9 and the lugs 47 are guided therein in their vertical movement. The lowermost end of the guide bushing 48 is turned in at 50 to form a ledge for the support of a shouldered buffer bushing or bearing 51 which is recessed to receive the lower end of the spring 43a. Bushing 51 projects a short distance below the undersurface of inturned ledge 50 and, at the end of the retracting movement of ram 36, the undersurface of this bushing is struck by the upper face 37a of enlarged head 37. When this occurs spring 43a is supported between nut 43 and buffer bushing 51 abutting against face 37a and hence no longer urges the ram upwardly. This feature, possibly in combination with the residuum of air being vented from chamber 107 cushions the ram as it approaches the upper limit of its retracting movement. In practice it has been found that the top of the ram never strikes the undersurface of ledge 50 though bushing 51 projects only about ⅛" beyond the undersurface of that ledge.

Figure 9:
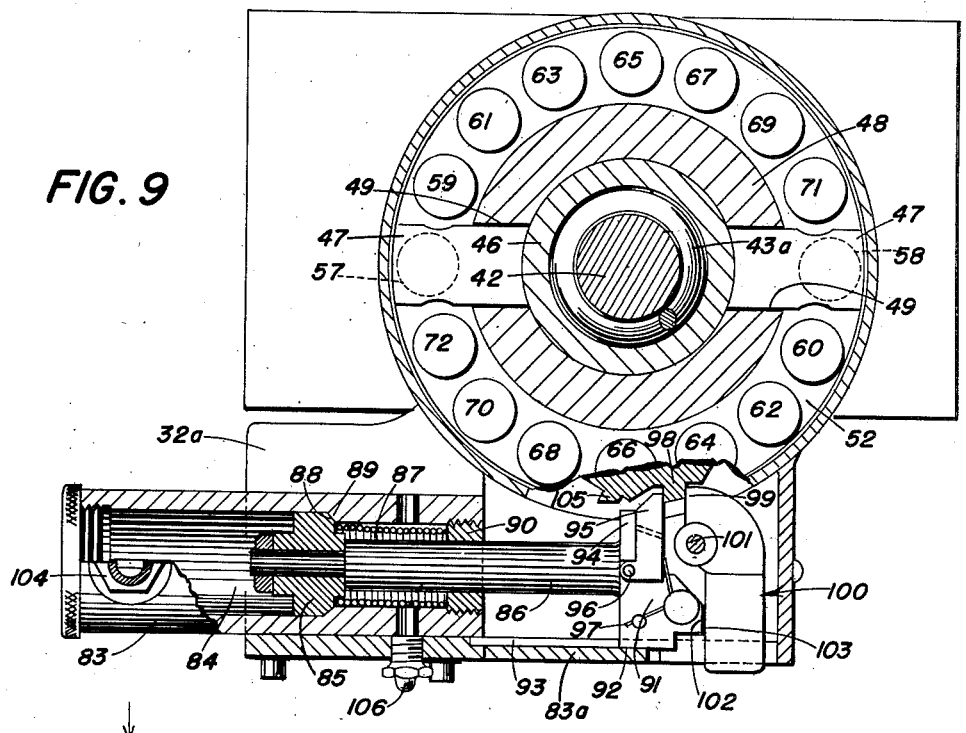
Fig. 9 is an enlarged transverse sectional view taken along a line substantially corresponding to line 9—9 of Fig. 5 and showing the details of the spacing block positioning or indexing device.
Figure 11:
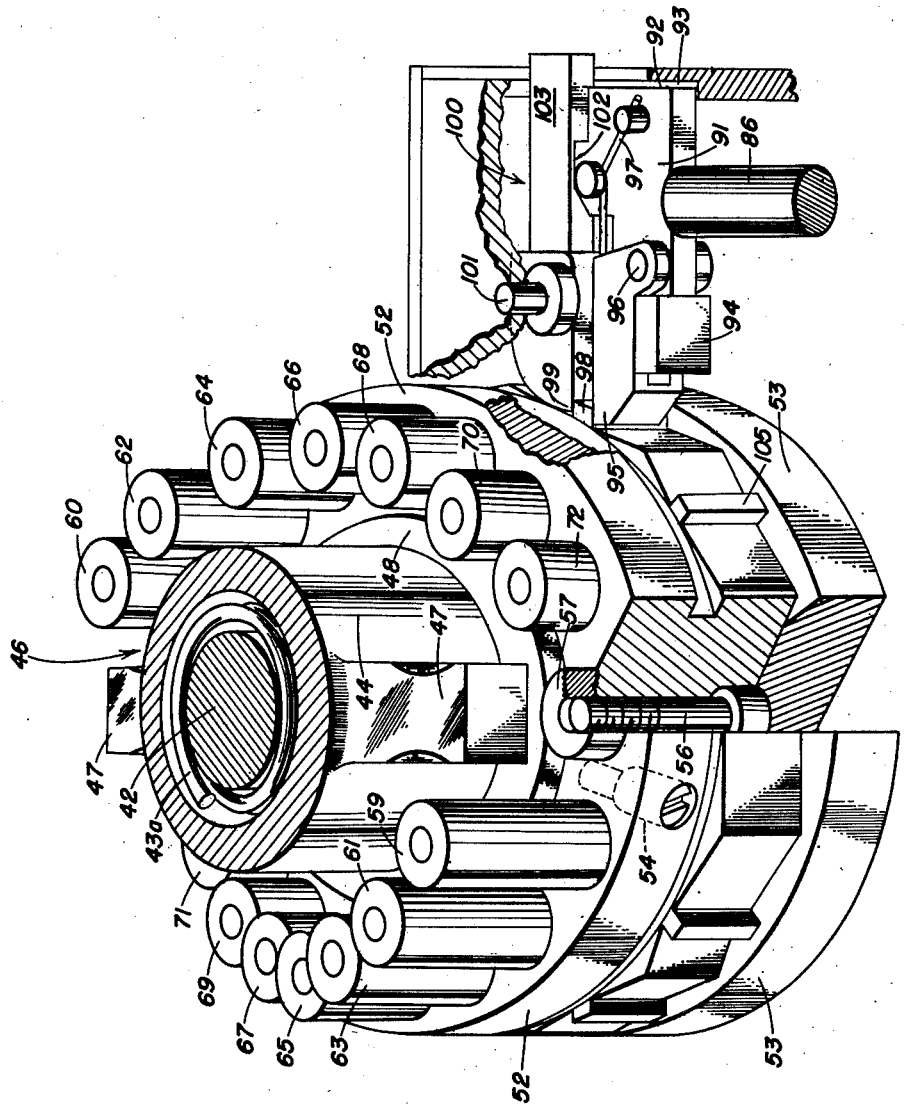
Fig. 11 is a detailed perspective view with a portion cut away, showing the construction of the stop pin indexing mechanism.

The limit stop positioning mechanism is best illustrated in Figs. 9 and 11. As there shown a rotatable index ring 52 closely encircles the guide bushing 48 and rests upon a radially extending ledge 53 which is integral with bushing 48. A spring pressed detent 54 riding in groove 55 in the guide bushing restrains the ring 52 from upward displacement.

A plurality of accurately dimensioned spacer blocks are arranged in pairs on the upper surface of rotary ring 52 to which they may be secured by any suitable means such as retaining screws 56. These spacer blocks are in pairs of equal length and are mounted upon the upper surface of the ring so that the two members of each pair are spaced 180° apart around the surface of the ring. Thus block 57 is the same height as block 58 (not shown), block 59 is the same height as block 60, block 61 is the exact height of block 62 etc., all around the ring until the embodiment illustrated 8 pairs of blocks are provided spaced at 180° intervals around the ring.

Figure 7:
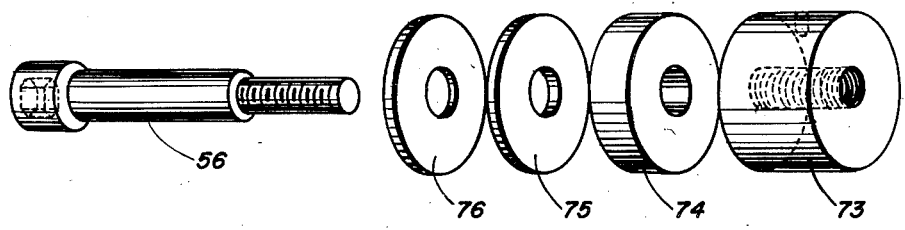
Fig. 7 is an exploded view of an alternative form of spacing block.

If desired, the spacer blocks may be formed of a number of layers as illustrated in Fig. 7. In this event the desired length may be obtained by a combination of blocks selected from a kit containing accurately pre-ground blocks of such variety of thicknesses that any desired length of block may be obtained by proper combination. As illustrated in Fig. 7 such built-up blocks include a threaded spacer 73 on top and one or more spacers 74, 75 and 76 thereunder, each centrally apertured to receive the retaining screw 56. The use of such multipart blocks eliminates the need for accurately finishing special blocks for each job.

Figure 8:
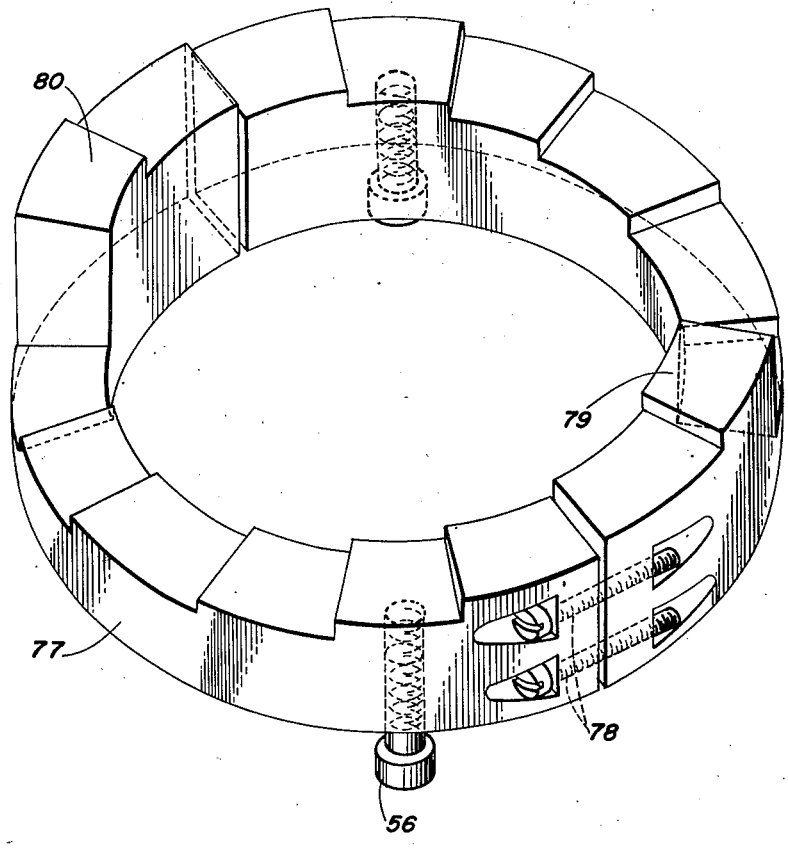
Fig. 8 is a perspective view of another alternative form of spacing means.

If desired an alternative form of fixed spacing member may be employed as illustrated in Fig. 8. This member comprises a ring 77 split to permit assembly about the guide member 48 and secured together at the points of contact by suitable fastening means such as screws 78 only two of which are shown. Ring 77 is secured by screws 56 to a toothed indexing ring similar to the toothed portion of ring 52. As noted the upper surface of the split ring 77 has a plurality of steps of equal height disposed on opposite sides of the ring. Thus step 79 is the same height as step 80, etc. The use of such integral ring type spacing block may be particularly convenient where large quantities of workpieces are to be machined or where there are repeated shop orders for a particular workpiece.

It will be apparent that rotation of ring 52, Figs.

9 and 11, successively positions different pairs of spacer blocks under the oppositely extending lugs 47 mounted upon the piston skirt 46; consequently, by rotating the ring 52 to bring selected pairs of such blocks under the lugs, the descent of the piston skirt 46 and its attached piston shaft 42 and ram 36 can accurately be limited in accordance with predetermined measurements. Slot 81 in the upper part of head member 32 registers with notch 82 in ledge 50 to provide access to the underside of the spacer block anchoring screws 56. By rotating ring 52 each of these screws 56 may successively be brought into registry with said notch so as to facilitate removal and replacement of such blocks.

Figure 10:
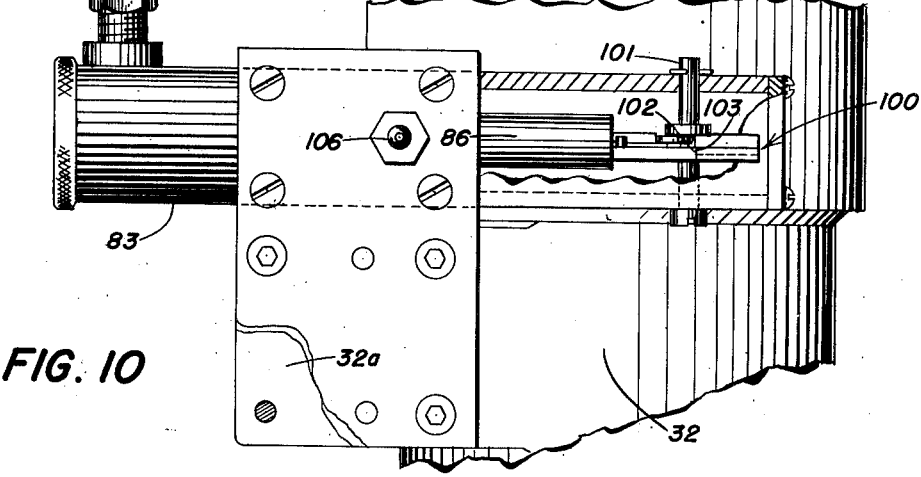
Fig. 10 is an enlarged side view partly broken away of the indexing mechanism shown in Fig. 9.

In order automatically to position successive pairs of spacer blocks under the lugs 47 there is provided the indexing mechanism 31 shown in Figs. 9, 10 and 11 and which comprises a laterally extending housing 83 supported on pad 32a and bored to provide a cylinder 84 in which piston 85 secured to a piston shaft 86 reciprocates. Compression spring 87 surrounds shaft 86 and normally urges the piston 85 and shaft 86 to the left. This piston is preferably a slightly loose fit in the cylinder to assure easy action and the forward end of the piston is chamfered at 88 to provide a face which will seat against a correspondingly chamfered face 89 to effectively seal the parts against the escape of air past the piston when the piston is in its extreme right-hand position. A threaded bushing 90 guides the shaft 86 and forms an abutment for spring 87.

A pawl or step by step indexing mechanism is provided on the right-hand end of shaft 86 and includes a guide block 91, one side 92 of which rides in a groove 93 in a side plate 83a to restrain the piston shaft from rotation. A portion of guide block 91 extends on the opposite side of the piston shaft 86 to form an abutment 94. A toe 95 is slotted to extend on both sides of guide plate 91 and is hingedly mounted thereto at 96. A small wire spring 97 normally urges this toe into engagement with the abutment 94.

The stop supporting ring 52 is provided around its lower periphery with a plurality of teeth, one of which, tooth 98, is shown seized between between the tip of the toe 95 and the tip 99 of a detent arm 100 pivotally mounted at 101. With the piston shaft 86 in its extended position as shown in Figs. 9 and 10 the end 102 of the guide plate 91 bears against the heel 103 of the detent arm 100 causing it to pivot around fulcrum 101 to urge the tip 99 of the detent arm 100 into positive engagement with one side of index tooth 98.

In the indexing operation it will be noted that an impulse of air entering the bore of the housing 83 through coupling 104 will force piston 85 to the right causing toe 95 to engage one side of an index tooth and rotate the spacer block supporting ring 52 to position a new set of blocks under the piston movement limiting lugs 47.

When the air is vented from the indexing cylinder 84 the piston 85 will be returned to the left by compression spring 87 and toe 95 will pivot about point 96 to clear the next succeeding tooth 105. Once clear spring 97 will snap the toe back into engagement with abutment 94 so that the next impulse of air in the indexing cylinder will move the next tooth 105, into the position formerly occupied by tooth 98.

Since detent 100 is free to pivot around fulcrum point 101 when end 102 is clear of the detent heel 103, the detent tip 99 will not interfere with the rotation of ring 52 until the piston again reaches the right-hand limit of its movement and a new tooth is engaged between the detent tip 99 and toe 95. A lubricant fitting 106 is provided as shown.

Referring again to Figs. 4, 5 and 6 it will be noted that air hose 24 leads into the hollow cylinder 107 formed within the piston receiving cap 108 and, by opening a thumb valve 109 communication is afforded through a pipe 110 to the operating cylinder of the indexing mechanism.

A stroke adjuster and auxiliary buffer is mounted in the upper part of the cap 108 and includes a hollow stem 111 threaded into the cap and retained in position by lock nut 112. Packing 113 prevents leakage. An extension 114 is threaded into the lower end of stem 111 and supports a mushroom type valve 115 mounted for axial movement therein. Compression spring 116 normally urges this valve downwardly to seat it in the manner illustrated in Figs. 4 and 5. A buffer cap 117 is fitted around the extension 114 with a very slight clearance and has a central aperture 118 through which air may be admitted to the chamber formed between the inside wall of the cap and the undersurface of extension 114. The stem of valve 115 is preferably notched or grooved so that aperture 118 is not fully closed by the seating of the valve stem thereagainst thereby allowing air to enter chamber 166 when valve 115 is unseated. A pin 119 projecting from extension 152 engages in a slot 120 in the cap to retain it in place.

As illustrated in Fig. 6 the head of stem 111 may be provided with graduations about its periphery which may be read against a pointer 121 to indicate the relative axial displacement of buffer cap 117 the bottom surface of which is contacted by nut 45 in retracted position. Pointer 121 may be pivoted at 122 so that it may be swung back out of the way to adjust locking nut 112.

The air control valve 25 is illustrated in detail in Figs. 12 and 13 and comprises a body block 123 suitably apertured to receive a fluid inlet fitting such as valve 124 and a fluid outlet fitting 125 which connects to the air hose 24 leading to the tool operating head.

An air inlet valve 126 of the inverted mushroom type is mounted in block 123 so that its head 127 engages a seat 128 to control the flow of air from the supply line 30, through a portion of bore 129, and through air hose 24 to the tool supporting head. The stem of valve 126 passes through a packing bushing 130 and is threaded to receive a nut 131 which compresses a spring 132 to normally urge the valve upwardly into a closed position.

The block 123 also contains a vent valve 133, similar in construction to inlet valve 126, and having a head 134 which is urged against seat 135 by the tension of spring 136 normally to seal off bore 129 and prevent the escape of air therefrom. However, during the venting movement of this valve it is moved downwardly away from the seat and air is permitted to escape from hose 24 through bore 129, channel 137, passage 138 and petcock 139 into the atmosphere.

A valve actuating mechanism is located on top of the block 123 and comprises an elongated trip lever 140 fulcrumed on a pivot 141 and reinforced against side thrust by spaced guide blocks 142 and 143 extending upwardly from the block 123. The portion of this lever to the left of the fulcrum contacts the rounded upper end of air valve 126 and the portion of the lever to the right of the fulcrum bears against the rounded upper end of vent valve 133. A compression spring 144 normally urges the left end of the trip lever upwardly and is sufficiently strong to overcome spring 136.

The outermost end of the trip lever 140 is horizontally slotted at 145 to provide spaced upper and lower projections 146 and 147, respectively. A roller supporting latch member 148 has a horizontal tongue 149 which enters the slot 145 and is pivotally secured by a vertical pin 150. The upper end of this pin extends beyond projection 146 and terminates in a head 151 which retains a coil spring 152 in place about the upper portion of the pin. One end of the coil spring 152 is anchored to a mooring post 153 affixed to the lever 140 and the opposite end of the spring is turned downwardly at 154 and passes through a small hole in the latch member 148. This hole extends all the way through the latch member so as to permit reversal of the parts. The latch member supports upper and lower rollers 155 and 156 for rolling engagement with a regulating means or tripping cam 29 which may be secured to the work supporting table for movement therewith. Latch 148 has a pad portion 157 which normally bears against the side of lever 140 by the pressure of spring 152 but yieldingly permits displacement when an obstruction is encountered in one direction.

As illustrated in Fig. 13 a plate 158 may be pivotally secured at its lower end by screw 159 to one end of the valve body. This plate is provided with a trip lever engaging ledge 160 slideable under the undersurface of the trip arm 140 to hold that arm upwardly and thus retain valve 126 open. This plate 158 is preferably of the L-shape illustrated so as to clear the venting petcock 139. A flat spring 161 formed as shown normally urges the ledge 160 under the trip arm 140 and this spring is secured in place by pin 162 and screw 163. Plate 158 may be used with special advantage on long cuts such as the machining operation shown in Fig. 3. When not being used, plate 158 may be swung to the right and secured against pivotal movement in that position by screw 170 shown in place in Figs. 12 and 14. This screw 170 extends through a hole 171 in plate 158 and is threaded into block 123 at 172.

In the event it is desired to reverse the working stroke of the machine tool the latch member 148 is removed by extracting pin 150 and spring 152, turning the latch member 148 upside down and replacing the pin and spring. In this reversed position the pad 157 lies on the opposite side of trip lever 140 and spring 152 yieldingly permits the latch to pivot in the opposite direction. The plate 158 can be reversed by simply removing pivot screw 159, turning over the plate and replacing the screw. The spring 161 can likewise be reversed and held in its reversed position by screw 163a. The body of the plate 158 then lies on the opposite side of the trip arm 140 and latch 148.

Operation

In the use of the foregoing invention the machine such as a planar, vertical boring mill, etc., first has the workpiece or workpieces to be machined installed thereon and secured in place. Next the tool holding head 20 is mounted on the usual clapper box or tool post as illustrated in Figs. 1, 2 and 3 and valve 25 is secured adjacent the path of movement of the work supporting table. A cam 29, of suitable length, is then attached to the edge of the table in such a manner that its sloping forward end will engage the lowermost roller of latch 148 to raise the outer end of lever 140. The rear end of cam 29 is not sloped but terminates in a sharp edge to cause the latch to drop off abruptly and thereby cause a rapid closing of inlet valve 126 and opening of vent valve 133.

In installing the present invention the spacer blocks and, when used, the auxiliary buffer are next adjusted to position the tool for cutting in the desired planes. The spacer blocks may readily be removed by loosening lock ring 164 (Figs. 4, 5, 6) and raising the cylindrical cover 165 so as to expose the spacer block supporting ring 52. Since this ring 52 is retained in its lowermost position only by the spring pressed detent 54 it may readily be moved upwardly to provide access from below to the heads of the spacer block anchoring screws 56. If desired the heads of these screws may individually be positioned above the slot 81 to permit access from below. The proper stop pins accurately ground to the desired length may then be installed in 180° spaced pairs about the ring and, if less than 8 cuts are to be made then duplicate sets of stops of the desired length may be installed. Where the number of steps to be machined is 2, 4 or 8 it will be obvious that the desired accurate repetitive positioning of the cutting tool can be achieved by simply duplicating spacer blocks of the required length as desired. However, where an off number such as 3, 5, 7 or 9 different planes are to be machined without interruption then the combined stroke adjuster and buffer mechanism contained in the cap 108 may be used to position the tool for the odd cutting steps.

The stroke adjuster may be set by bodily rotation of screw 111 to move the entire mechanism into or out of the cap 108. It will be apparent that if three surfaces are to be machined then the buffer mechanism may be adjusted to position the ram in a desired plane when it is in its retracted position and a cut may be made with the ram so retracted.

The machine may then be placed in operation causing the desired movement of the work table. In the installation illustrated in Figs. 1 and 2 this will be a reciprocating movement and the table supported cam 29 will successively raise and release the trip lever of air control valve 25 to alternately build up and release air pressure in line 24 leading to the tool holding head 20. The impulse of air under pressure arriving through hose 24 passes downwardly through valve 109 and pipe 110 to the indexing cylinder 84 where it bears against index piston 85 and moves it to the right end of the cylinder as shown in Fig. 9 compressing index spring 87 and moving piston shaft 86 to the right. Toe 95 having engaged tooth 98 rotates the ring 52 one-sixteenth of a revolution to bring a set of spacer blocks under the oppositely extending piston supported lugs 47. Overtravel of the ring is prevented by tip 99 which engages the opposite side of tooth 98 and forms a part of arm 100 pivoted in the index housing 83. This tip is retained in its tooth engaging position by the oppositely extending body portion 103 against which heel 102 bears. As air pressure builds up in the index chamber the tooth 98 is securely clamped between toe 95 and tip 99.

This impulse of air also builds up pressure in chamber 107 to force piston 44 downwardly, however, the indexing step is taken before the piston 44 commences its downward movement since the area of the indexing piston 85 and the strength of its spring 87 are so proportioned that a relatively small pressure, preferably on the order of 13 pounds per square inch is sufficient to complete the indexing operation.

When the pressure increases in chamber 107 to preferably something over 26 pounds per square inch piston 44 starts to move downwardly and carries piston rod 42 connected at its lower end to ram 36. Ram 36 carries cutter bit 40. When a pressure of about 50 pounds per square inch has built up in chamber 107 the oppositely extending lugs 47 strike the upper surface of the particular space blocks located thereunder to halt the descent of the piston and to position tool 40 in the desired plane for the initial cutting stroke. Lugs 47 do not strike against the space blocks with any force. Instead they at first touch rather lightly and then, as the pressure in chamber 107 increases, the piston is urged downwardly with an ultimate pressure of 90 pounds or more per square inch. With a piston area of about 4 square inches this amount of pressure is sufficient to positively hold the piston, ram and cutter in the desired plane with sufficient force to rigidly support the tool during its cutting operation. The area of the index piston 85 may be about 3/4 of one square inch in the embodiment illustrated but the index spring is so proportioned that the indexing step is completed before the ram movement starts.

As the incoming air under pressure enters chamber 107 a portion of this air also passes into the buffer unit through opening 118 and past mushroom valve 115 which is forced upwardly to permit air pressure to build up in chamber 166 provided in the handle of buffer control knob 167. When pressure within chamber 166 equals the pressure in chamber 107 valve 115 is closed by spring 116 and the buffer cap 117 is held in its lowermost position by the stem of valve 115 bearing thereagainst.

When the trip lever 140 drops off the end of the cam 29 secured to the table, inlet valve 126 closes and vent valve 133 opens. This immediately releases the pressure in chamber 107 at a rate which is dependent upon the adjusted position of petcock 139.

Compressed spring 43a thereupon rapidly raises piston 44, retracting ram 36. This retraction continues until the upper end 37a of the ram strikes the undersurface of buffer bushing 51 which moves upwardly a few thousands of an inch to cushion the blow. In the event the stroke adjuster and auxiliary buffer is employed, then that device is screwed down until the upper end 37a of the ram will not strike buffer bushing 51 but instead the top of the piston retaining nut 45 strikes the undersurface of the buffer cap 117 unseating the valve 115 upwardly. As valve 115 is unseated the air under high pressure in chamber 166 rushes out to fill the space within the buffer cap and cushion the upward movement of that cap. This buffing action is only momentary since the excess pressure rapidly escapes through the space left in the loose fit between the peripheral wall of the lower end 114 and the inner wall of the buffer cap 117.

By the above action it will be noted that the moving ram assembly does not strike its limit stops with great force at either extent of its movement, and vibration, wear and resulting inaccuracy is accordingly avoided.

In connection with the valve operating cam 29 it should be noted that in machining workpieces having several relatively short pads or bosses to be machined an individual cam may be attached to the work table for each pad, each such cam, of course, being of suitable length and positioned to hold inlet valve 126 open so that tool 40 will be maintained in cutting position for the particular pad. However, instead of using several individual cams a piece of angle iron of suitable length and having several appropriately spaced camming surfaces formed on the horizontal ledge thereof may be attached to the work table. This latter arrangement is of particular advantage where large production runs are to be made and it is necessary to completely dismantle the setup from time to time.

In machining operations such as that illustrated in Fig. 3 where the surfaces to be machined are relatively long and suitable cams of the required length might be costly, a short cam 29 and a tripping finger 168 may be used in conjunction with pivot plate 158 in place of the type of cam described above. This pivot plate as previously explained in connection with Fig. 13 may be used to retain valve 126 in open position thereby subjecting piston 44 to constant pressure from the air source. When this pivot plate is used, a short cam 29 is secured to the table in such position with regard to the surface to be machined that it will engage latch 148 to momentarily raise the outer end of lever 140 thereby permitting pivot plate 158 under the tension of spring 161 to swing into retaining position. At the end of the cutting action on the particular surface, trip finger 168 carried by the table strikes the tip 169 of plate 158 to swing the pivot plate to the right as viewed in Fig. 13 and allow the outer end of lever 140 to drop down under the influence of spring 144 to close valve 126 and open vent valve 133.

Although the foregoing description has been confined to the application of the present invention to planers and boring mills it is to be understood that there are a wide variety of machining operations performed on these and other types of machine tools in which the disclosed apparatus can be used with considerable advantage. It is believed that with the description of this invention at hand it will be readily apparent to those skilled in the art as to how to adapt this apparatus to the requirements of the particular machining operation.

It should be understood, of course, that the foregoing disclosure relates to only a preferred embodiment of the invention and that numerous modifications or alterations may be made therein without departing from the spirit and scope of the invention as set forth in the appended claims.

The invention described herein may be manufactured and used by or for the Government of the United States of America for governmental purposes without the payment of any royalties thereon or therefor.

What is claimed is:

1. A cutting head and control for use on a machine tool wherein relative movement is effected between a cutter and a workpiece comprising, a support, a cutter controlling ram movable on the support, means for alternately extending and retracting the ram to move the cutter toward and away from the workpiece during the cutting strokes, means for limiting the extension of the ram, and trip means for successively resetting the limit means to a plurality of positions in timed relation with the changing relative positions of the workpiece and cutter, whereby the ram may be extended a variety of distances to machine portions of a workpiece in different planes during a continuous cutting stroke.

2. A pneumatically operable head for supporting a cutter on a machine tool comprising, a housing, a reciprocable cutter support mounted in said housing, resilient means urging said support upwardly to retract the cutter from a workpiece, a fluid connection to supply fluid under pressure to the interior of said housing to force the cutter support downwardly against the resilient means, and a combined buffer and stroke adjuster mounted in said housing and extensible against the upper end of the cutter support to adjustably limit said support in its upward movement.

3. A pneumatically operable head for supporting a cutter on a machine tool comprising, a housing, a reciprocable cutter support mounted in said housing, resilient means urging said support upwardly to retract the cutter from a workpiece, a fluid connection to supply fluid under pressure to the interior of said housing to force the cutter support downwardly against the resilient means, a combined buffer and stroke adjuster mounted in said housing and extensible against the upper end of the cutter support to adjustably limit said support in its upward movement, and means for indicating the adjusted position of said combined buffer and stroke adjuster.

4. A pneumatically operable head for supporting a cutter on a machine tool comprising, a housing, a reciprocable cutter support mounted in said housing, resilient means urging said support upwardly to retract the cutter from a workpiece, a fluid connection to supply fluid under pressure to the interior of said housing to force the cutter support downwardly against the resilient means, a combined buffer and stroke adjuster mounted in said housing and extensible against the upper end of the cutter support to adjustably limit said support in its upward movement, said buffing means including a reservoir, valve means permitting access of air under pressure into said reservoir during the downward movement of the cutter support, said valve means being releasable when the cutter support reaches the upper end of its movement so as to release the stored air and cushion the cutter support in its upward movement.

5. A cutter holding head for a machine tool comprising, a housing, a ram reciprocable in said housing, said ram having a piston at its upper end and supporting a cutter at its lower end, the piston having an elongated skirt with a pair of diametrically opposed stop lugs thereon, a spacer block supporting ring adjacent the lower end of the piston and having spacer blocks thereon in pairs of equal height to be positioned in the path of said stop lugs and limit downward movement of the piston, and means for rotating said ring to bring selected pairs of spacer blocks into the path of said lugs.

6. The combination in a tool holder wherein a plurality of stops are successively positioned to limit the movement of a tool holding ram, of means for successively locating said stops in ram movement limiting position comprising; an index cylinder, a plunger reciprocable in said cylinder, means for reciprocating said plunger, a plurality of accurately dimensioned stops, a support for said stops, and means connecting the plunger to said support whereby successive stops are positioned in ram movement limiting position by actuation of the plunger.

7. In apparatus of the character described, a housing, a tool carrying ram supported by said housing, an index plunger, a space block supporting ring rotatably mounted on the housing and bearing a plurality of accurately dimensioned space blocks, stop means on said ram engageable with a selected space block to limit the downward movement of the ram, means carried by the index plunger for rotating said ring a predetermined distance to carry a selected space block into the path of the stop means, and means associated with the plunger for limiting the rotation of said ring when a selected space block is positioned in the path of the stop means.

8. In a cutter holding head for a machine tool, a support, a fluid operated tool holding ram mounted upon said support, means normally retaining said ram in retracted position, a fluid operated indexing member mounted upon said support, means normally retaining said indexing member in retracted position, a plurality of spacing blocks moveable by said indexing member into a ram movement limiting position, means normally retracting the ram and the indexing member, and means for simultaneously applying fluid pressure to said ram and said indexing member, the fluid operating areas of the ram and indexing members being so proportioned to the force exerted by their respective retracting means that upon application of fluid pressure the movement of the index member is substantially completed to position a space block in ram limiting position before the ram commences to move.

9. A cutter holding head for a machine tool comprising, a housing having a ram bore and an index bore, a tool carrying ram member mounted in the ram bore and extensible to be projected therefrom by fluid pressure within the ram bore, an index plunger mounted in the index bore and extensible to be projected therefrom by fluid pressure within the index bore, means normally retracting the ram and the index plunger into their respective bores, a ring mounted on said housing for rotation by the projecting movement of the index plunger, a plurality of space blocks on said ring, a lug on said ram engageable with at least one of said space blocks for limiting the projecting movement of the ram, means for simultaneously applying fluid pressure to each of said bores to project each of the members, the area of the bore and the strength of the resilient means for each member being so proportioned that upon application of fluid pressure the projecting movement of the index plunger is substantially completed before the initial movement of the ram.

10. A pneumatically operable head for supporting a cutter on a machine tool comprising a housing, a cutter support mounted in said housing for reciprocation between extended and retracted positions, means for supplying fluid pressure to said housing to move the cutter support to its extended position, a bearing means slidably mounted in said housing, a resilient means for acting against said bearing means to urge the cutter support toward its retracted position, and means on the cutter support to engage the bearing means as said support approaches its retracted position to release the cutter support from the effect of said resilient means.

11. A pneumatically operable head for supporting a cutter on a machine tool comprising a housing, a cutter support mounted in said housing for reciprocation between extended and retracted positions, means for supplying fluid pressure to said housing to move the cutter support to its extended position, a supporting means mounted on said housing, a bearing means mounted on said supporting means, a resilient means for acting against said bearing means to urge the cutter support toward its retracted position, and means on the cutter support to engage the bearing means as said cutter support approaches is retracted position to release the cutter support from the effect of said resilient means.

12. A pneumatically operable head for supporting a cutter on a machine tool comprising a housing, a cutter support mounted in said housing for reciprocation between extended and retracted positions, means for supplying fluid pressure to said housing to move the cutter support to its extended position, a bushing mounted in said housing and having a shoulder thereon, a bearing means slidably mounted in said bushing limited in movement in the direction of extension of the cutter support by said shoulder, a resilient means for acting against said bearing means to urge the cutter support toward its retracted position, and means on the cutter support to engage the bearing means as said cutter support approaches its retracted position to release the cutter support from the effect of said resilient means.

13. A tool holder and control therefor for use on a machine tool which is provided with a table to which a workpiece is secured and comprising, a support, a ram movable in said support to move a cutting tool to a plurality of predetermined cutting positions, means for moving said ram in said support, variable means for limiting the movement of said ram at said predetermined cutting positions, and means operable during the progress of a continuous cutting stroke of the machine sequentially varying said limit means whereby said cutting tool may be moved to one of the plurality of cutting positions, said means for varying the limit means including a pneumatically operated indexing mechanism operatively connectable to said limit means in response to predetermined pneumatic pressures, a control assembly pneumatically connected between a source of fluid under pressure and said indexing mechanism, regulating means secured to the workpiece support in predetermined positions with respect to the workpiece table, said control assembly being temporarily engageable with said regulating means in sequence and substantially simultaneously with the arrival of the cutter at predetermined positions on the workpiece to thereby regulate the operation of said control assembly, indexing mechanism and limit means for effecting a cutter control program for each stroke of the cutter and related to sequential work operations to be performed upon spaced surfaces of the workpiece.

14. A cutter holding head and control for a machine tool which includes a table to which a workpiece is secured comprising, a housing adapted to be secured to the usual tool supporting pad of the machine such housing having a cylindrical opening therein, a cutter support reciprocable in said opening, means to limit movement of said cutter support to a plurality of predetermined cutting positions, said means including a plurality of accurately dimensioned space blocks, block engaging means on the cutter support for engagement with a space block to position the cutter in accordance with the size of the block, and automatic means for moving the space blocks of varying size into the path of the block engaging means, said automatic means including a toothed indexing ring secured to said space blocks, a pneumatically operated pawl connectable to and disconnectable from said indexing ring in response to predetermined pneumatic pressures, a pressure control assembly pneumatically connected to a source of fluid under pressure and said pawl, and regulating means secured to the workpiece table in predetermined positions with respect to predetermined areas on the workpiece, said control assembly including fluid inlet, outlet and venting passages, valves disposed in said inlet and venting passages, and means for actuating said valves in response to temporary engagement with said regulating means in sequence and substantially simultaneously with the arrival of the cutter at predetermined positions on the workpiece to thereby regulate the operation of the control assembly, pawl, indexing ring, and limit means for effecting a cutter control program for each cycle of the cutter and related to sequential work operations to be performed upon spaced surfaces of the workpiece.

15. A tool supporting head and control for a machine tool having a work supporting table wherein the cutter may be accurately and rapidly longitudinally indexed comprising, a tool support, indexing means carried by said support, said indexing means comprising a plurality of different size space blocks, stop means carried by said head for successively engaging said space blocks to thereby position the cutter in accordance with the size of the spaced block engaged, automatic means including an actuating assembly operatively connected to the indexing means and to the table and controlled by the movement of the table for effecting a predetermined relative intermittent engagement of the indexing means with the stop means to sequentially engage the stop means with the space blocks of varying sizes as a predetermined cycle of machine operations is performed, and means to move the tool support downwardly in timed relation with the operation of said actuating assembly.

16. A cutting head and control for use on a machine tool wherein relative movement is effected between a cutter and a workpiece comprising, a support, a cutter controlling ram movable on the support, means for alternately extending and retracting the ram to move the cutter toward and away from the workpiece during the cutting stroke, means for limiting the extension of the ram, said limiting means including different size space blocks, and trip means for successively resetting the limiting means to a plurality of positions in timed relation with the changing relative positions of the workpiece and cutter whereby the ram may be extended a variety of distances to machine portions of a workpiece in different planes during a continuous cutting stroke.

LUTHER E. LEE.

References Cited in the file of this patent
UNITED STATES PATENTS

| Number | Name | Date |
|---|---|---|
| 590,051 | Weddell | Sept. 14, 1897 |
| 1,081,932 | Smith | Dec. 18, 1913 |
| 1,287,342 | Knight | Dec. 10, 1918 |
| 1,430,681 | Pierce | Oct. 3, 1922 |
| 1,451,061 | Trasch | Apr. 10, 1923 |
| 2,017,999 | West | Oct. 22, 1935 |
| 2,154,718 | Bannon | Apr. 18, 1939 |
| 2,370,286 | Berger | Feb. 27, 1945 |